United States Patent [19]

Varady

[11] Patent Number: 4,529,573
[45] Date of Patent: Jul. 16, 1985

[54] GAS INJECTION CONTROL

[75] Inventor: Victor A. Varady, Bartlett, Ill.

[73] Assignee: UOP Inc., Des Plaines, Ill.

[21] Appl. No.: 595,109

[22] Filed: Mar. 30, 1984

Related U.S. Application Data

[62] Division of Ser. No. 389,518, Jun. 17, 1982, Pat. No. 4,464,476.

[51] Int. Cl.$^3$ ............................................. B01J 37/12
[52] U.S. Cl. ..................................... 422/111; 55/226;
137/487.5; 208/DIG. 1; 422/112; 422/144;
422/119; 502/6; 502/41
[58] Field of Search ............... 422/111, 112, 144, 107,
422/119; 208/DIG. 1; 502/6, 41; 137/487.5;
261/26, 30, 122; 55/226

[56] References Cited

U.S. PATENT DOCUMENTS

| | | | |
|---|---|---|---|
| 3,175,968 | 3/1965 | Berger | 208/DIG. 1 |
| 3,316,176 | 4/1967 | Stewart et al. | 208/DIG. 1 |
| 3,378,483 | 4/1968 | Worrell et al. | 137/487.5 |
| 3,410,793 | 11/1968 | Stranahan et al. | 252/417 |
| 3,542,060 | 11/1970 | Nienhois | 137/487.5 |
| 3,699,989 | 10/1972 | O'Connor et al. | 137/487.5 |
| 3,746,037 | 7/1973 | Buerger et al. | 137/487.5 |
| 3,748,448 | 7/1973 | Sayles | 208/DIG. 1 |
| 4,032,300 | 6/1977 | Parker et al. | 23/288 B |
| 4,231,262 | 11/1980 | Bull et al. | 73/861.04 |
| 4,364,849 | 12/1982 | Vickers et al. | 252/417 |

OTHER PUBLICATIONS

Petroleum Processing Handbook, Bland and Davidson McGraw Hill, 1967, Figures 10–22 and 10–23.

Primary Examiner—Barry S. Richman
Assistant Examiner—William R. Johnson
Attorney, Agent, or Firm—William H. Page, II; Richard J. Cordovano

[57] ABSTRACT

A process vessel which contains a control system for maintaining average pressure drop across gas discharge nozzles above a minimum valve to prevent the occurrence of inactive nozzles, said nozzles comprising part of a distributor which is used to distribute gas across the lower portion of the processing vessel, wherein the control system comprises:

(a) means for establishing a flow signal representative of the rate of flow of gas in said pipeline supplying the gas to said distributor;
(b) means for establishing a temperature signal representative of the temperature of the gas flowing in said distributor;
(c) means for establishing a pressure signal representative of the pressure of the gas flowing in said distributor;
(d) computing means for calculating the average pressure drop across said nozzles using said flow, pressure, and temperature signals and appropriate constant parameters and equations;
(e) means for comparing said average pressure drop across said nozzles with a minimum value, generating a correction signal if said minimum value is larger, and transmitting said correction signal; and
(f) adjustment means responsive to said correction signal which are capable of increasing the average pressure drop across said nozzles to prevent the occurrence of inactive nozzles.

10 Claims, 1 Drawing Figure

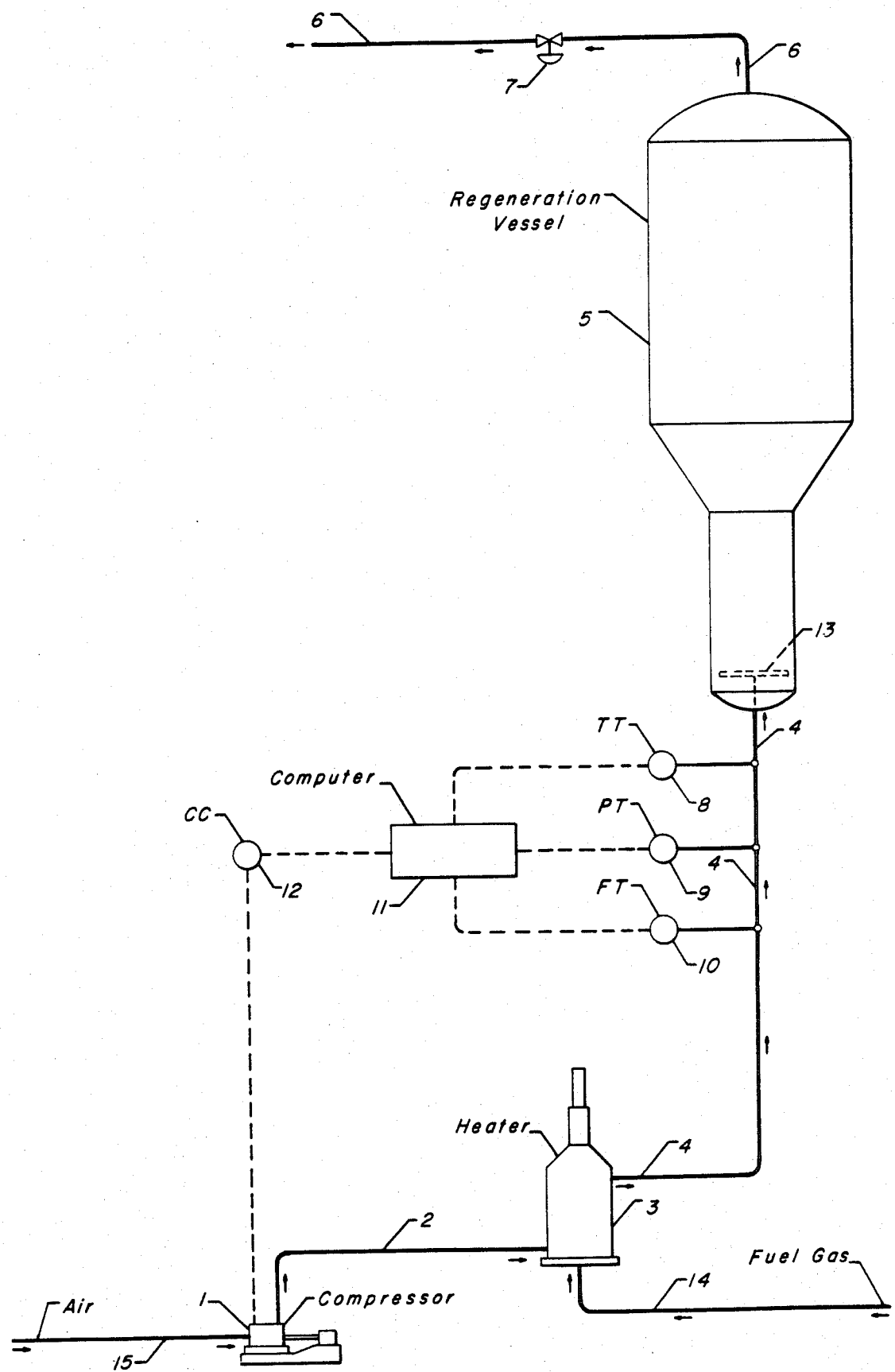

GAS INJECTION CONTROL

This is a divisional application of pending application Ser. No. 389,518 filed on June 17, 1982 now U.S. Pat. No. 4,464,476 issued Aug. 7, 1984.

BACKGROUND OF THE INVENTION

This invention relates to a method of protecting a gas injection system from inactive gas distribution nozzles. It is a common processing step in chemical plants and oil refineries to inject a gas into a vessel containing a liquid or a bed of particles so that the gas flows in an upward direction through the vessel. When the vessel contains a bed of particles, the gas may be injected at a flow rate sufficient to fluidize the particle bed. The gas is distributed across the horizontal cross-section of the vessel by means of a distributor containing a multiplicity of nozzles through which the gas flows out of the distributor and into the vessel.

It is normally essential to the process taking place in the vessel that gas flow across any horizontal cross-section of the vessel be relatively uniform, to ensure that the entire contents of the vessel will be contacted by the gas. This is accomplished by locating the nozzles in a relatively uniform pattern across a horizontal cross-section of the vessel and properly designing the distributor, taking into account the required gas flow. The distributor often comprises a piping network, which is sized and configured so that the pressure drop from the network inlet point to and including any nozzle is approximately equal to that to and including any other nozzle; thus there is an approximately equal flow out of each nozzle. Since the lengths of the flow paths from the network inlet point to each nozzle are normally not equal, the design methods used to achieve approximately equal flow through each nozzle are to use varying pipe diameters and to make the pressure drops across the nozzles large in comparison with the pressure drops for the flow paths from the network inlet point to each nozzle. An example of a piping network distributor and information on distributor design may be found in U.S. Pat. No. 4,032,300 (Parker et al.). Another type of distributor comprises a vessel-like construction having a very small height, all surfaces of which are approximately parallel to those of the processing vessel, and which has a multiplicity of gas nozzles on its upper surface.

In many processes, the pressure in the vessel varies considerably, as a function of process changes taking place in processing elements upstream or downstream of the vessel. Often, it is necessary that the flow of gas to the nozzles vary in response to changed process conditions. The temperature of the gas may not remain constant. Any one of these variations in pressure, flow, and temperature affect the pressure drop across the nozzles, as will be seen by means of the equation and text presented herein. If the average pressure drop across the nozzles falls to a low value relative to the static head in the vessel, the quantity of gas flow through each nozzle will vary widely, with some nozzles passing very little gas or no gas. A nozzle having little or no gas flowing through it is called an inactive nozzle. The average pressure drop across the nozzles is the average of the pressures inside the distributor at the inlets to each of the nozzles minus the pressure in the vessel in the vicinity of the nozzles. As mentioned above, an effort is made during design of the distributor to minimize the individual variations from the average.

One of the results of inactive nozzles is uneven gas distribution in the vessel, causing less efficient operation of the process. In addition, liquids or solids may travel backward through the nozzles into the distributor and possibly further upstream to cause damage to the blower supplying gas to the process. It may be necessary to shut down the process to clean out the distributor and piping, particularly in the case where the vessel contains a bed of solids.

In order to prevent inactive distributor nozzles, it is known to those skilled in the art that the average pressure drop across the nozzles must be no less than a value consisting of a fraction times the static head in the vessel. The fraction generally accepted by those skilled in the art is approximately 0.3 to 0.33. The static head in the vessel is taken in normal operation and is the product of the actual height of the liquid or particles in the vessel and the density of the vessel contents during processing.

It should be noted that the circumstances described above exist even though the pressure of the gas in the distributor exceeds the pressure in the vessel. The vessel contents will flow into the distributor when vessel pressure is greater than that in the distributor; however, it is not the primary object of the instant invention to correct this pressure imbalance, but to prevent the occurrence of inactive nozzles.

This invention is especially adapted for use in connection with a regenerator vessel used in the fluid catalytic cracking of hydrocarbons. In this process, hydrocarbon feed and catalyst are introduced into a reactor in which the cracking reactions take place to produce hydrocarbon products. As a result of the reactions, the catalyst acquires a coating of carbonaceous matter, usually referred to as coke, which interferes with the effectiveness of the catalyst. The normal procedure in a fluid catalytic cracking plant is to continuously withdraw catalyst, treat it to remove coke, and return it to the reactor. Treatment is accomplished by subjecting the catalyst to a high temperature environment in a pressure vessel called a regenerator. The high temperature environment is comprised of pressurized air serving as a fluidizing medium for the catalyst and as a source of oxygen for combustion of the accumulated surface deposits (coke). Fluid catalytic cracking is a very well known process with a multiplicity of variations, including different equipment arrangements and operating conditions. Information on the process is available from numerous sources, including *Petroleum Processing Handbook,* Bland and Davidson, McGraw-Hill, 1967, page 3-2 et. seq. FIGS. 10-22 and 10-23 of this reference show regenerator vessels in typical configurations with typical control systems.

Air flow to the distributor and nozzles in a regenerator is normally controlled at a constant value corresponding to the hydrocarbon feed rate to the catalytic cracking unit. When the hydrocarbon feed rate is reduced, it is necessary to reduce the air flowing to the regenerator. A reduction in air flow rate reduces pressure drop across the nozzles and will cause inactive nozzles if it is sufficiently large. It is not possible to simply establish a minimum below which the air flow rate will not be reduced because the minimum flow required to prevent inactive nozzles, when flow rate alone is considered, is higher than the lower range of air flow rates at which it is necessary to operate the regenerator. If nozzles become inactive, catalyst which is not fully regenerated may be returned to the reactor, resulting in a less efficient catalytic cracking process. Also, catalyst may flow into the distributor and air piping. The inventor has knowledge of at least one instance in which, during apparently normal operation of a regenerator, catalyst moved through inactive nozzles and through pipelines and valves to the air blower supplying the nozzles, resulting in severe damage to the blower.

Pressure in a regenerator is also a controlled variable which must be adjusted in response to process conditions. When regenerator pressure is increased, pressure drop across the nozzles decreases. This is true even though the flow rate through the nozzles is controlled at a constant value. Temperature of the air supplied to the nozzles, which is not normally controlled, can vary, thereby affecting pressure drop across the nozzles. The variable factors which determine the temperature of the air at the nozzle inlets are temperature of the air drawn from the atmosphere by the blower, heat of compression, and regenerator temperature, which affects the amount of heat transferred to the air as it flows to the nozzles.

Thus, it can be seen that, as a practical matter, the possibility of inactive nozzles developing as process operating parameters change cannot be easily taken into account by the operators of the unit and that a system for automatically monitoring for process conditions that lead to inactive nozzles is desirable.

In a complex processing unit, such as a fluid catalytic cracking plant, hundreds of process variables are continuously monitored and often adjusted by the process operators. Only a small number of these adjustments have a bearing on the occurrence of inactive nozzles. Even though the results of the occurrence of inactive nozzles can be of major consequence, this is not considered to be a major operational problem and therefore receives little attention in the day-to-day operations. To require process operators to consider the problem before making a change and decide whether the change has potential to lead to inactive nozzles and then work through an equation to find if there will be a problem is clearly impracticable.

BRIEF SUMMARY OF THE INVENTION

It is an object of this invention to provide a method and apparatus for preventing the occurrence of inactive gas distribution nozzles, where the nozzles are part of a distributor used to distribute gas about the lower portion of a processing vessel containing liquid or particulate material, thereby preventing the flow of said material into the gas piping supplying the distributor and incomplete contact of the contents of the vessel with the gas. In one of its broad embodiments, the present invention comprises a method for maintaining average pressure drop across gas discharge nozzles above a minimum value, comprising the steps of: (a) establishing a flow signal representative of the gas flow in a pipeline supplying the gas to the distributor; (b) establishing a temperature signal representative of the temperature of the gas flowing in the distributor; (c) establishing a pressure signal representative of the pressure of the gas flowing in the distributor; (d) providing the flow, temperature, and pressure signals to computing means; (e) providing the computing means with the necessary equations and constant values; (f) calculating in the computing means the average pressure drop across the nozzles; (g) comparing the average pressure drop across the nozzles with said minimum value and generating a correction signal if said minimum value is larger; and, (h) transmitting the correction signal to adjustment means which are capable of increasing the average pressure drop across the nozzles and accomplishing said adjustments.

BRIEF DESCRIPTION OF THE DRAWING

The Drawing depicts catalyst regeneration equipment used in a fluid catalytic cracking process. Only those elements necessary to a clear understanding of the invention are shown in the Drawing, the use of other elements of a fluid catalytic cracking process unit being within the knowledge of those skilled in the art. The use of the example as presented in the Drawing is not intended as an undue limitation on the broad scope of the invention as set forth in the claims. Dashed lines represent vessel internals or transmission of control signals to and from items of control hardware.

DETAILED DESCRIPTION OF THE INVENTION

The invention can best be understood by reference to the Drawing, which represents a schematic example of a particular process in which the invention may be employed.

Referring to the Drawing, air from the atmosphere is drawn in through pipeline 15, is pressurized in blower 1, and then passes through pipeline 2, heater 3, and pipeline 4 to distributor 13 in regeneration vessel 5. Fuel is supplied to heater 3 by means of pipeline 14. Heater 3 is normally used only during start-up of the unit and may be fueled by gas (as shown) or liquid fuel. The output flange of heater 3 is often bolted directly to the inlet flange of regeneration vessel 5, so pipeline 4 need not exist. Regeneration vessel 5 contains particulate matter consisting of spent catalyst which is to be regenerated by passing hot air through it. The temperature of the air is raised by heat of compression and by heat generated in the combustion of the coke on the catalyst, so that after start-up, heat added by heater 3 is not needed to sustain combustion. The hot air enters the bottom of regeneration vessel 5 by means of distributor 13 which is disposed therein. The distributor contains a multiplicity of nozzles through which hot air passes into the bed. The nozzles may consist simply of holes in the distributor, capped pipe nipples with holes drilled in the caps and welded to the distributor, or other devices which are familiar to those skilled in the art. After the hot air passes through the vessel, it exits through pipeline 6. Control valve 7 regulates the pressure within regeneration vessel 5; other regulating means which are familiar to those skilled in the art may be employed. Compressor controller 12 regulates the flow of air to regeneration vessel 5 by means of adjusting compressor speed or inlet flow path geometry. Alternatively, it could adjust a throttling valve in pipeline 15.

In order to prevent incomplete regeneration of catalyst and flow of catalyst into distributor 13 and the other equipment when the average pressure drop across the nozzles in distributor 13 becomes low relative to the static head in regeneration vessel 5, items 8, 9, and 10 provide signals to computer 11. Temperature transmitter 8 provides a signal to computer 11 which is representative of the temperature of the hot air in pipeline 4. Pressure transmitter 9 provides a signal representative of the pressure in pipeline 4 to computer 11. Flow transmitter 10 provides to computer 11 a signal representative of air flow to the nozzles. If heater 3 is bolted directly to regeneration vessel 5, temperature transmitter 8 and pressure transmitter 9 can be connected to the vessel nozzles while flow transmitter 10 can measure flow in pipeline 2. Computer 11 is programmed to compute the average pressure drop over the nozzles, using the three measured variable parameters and the constant values provided to it. Whenever the average pressure drop falls below a level previously established and provided to computer 11 as the minimum acceptable level, computer 11 provides a signal to compressor controller 12 which increases its setpoint, i.e., raises the air flow rate value which is provided to compressor controller 12 as the required value. Compressor controller 12 then provides a signal which causes the compressor to increase the flow in pipeline 4 and thus increase the average pressure drop across the nozzles to the minimum acceptable level. The minimum acceptable average pressure drop across the nozzles is 0.3 to 0.33 times the static head in the vessel. In a fluid catalytic cracking regeneration vessel, static head is the product of fluidized bed density times height of the bed of particles. Fluidized bed density depends on air flow rate through the vessel, pressure, temperature, and slippage, which is the difference between air velocity and catalyst particle velocity.

An equation which may be used in computer 11 to determine pressure drop across the nozzles may be derived as follows. A well known equation for flow through a nozzle, which is presented on page 3–5 of Crane Co. Technical Paper No. 410, *Flow of Fluids*, 14th printing, 1974, published by the Crane Co. of Chicago and New York, is:

$$q'_h = 40,700 \, Y \, d_0^2 \, C \left( \frac{P_d P'_1}{T_1 S_g} \right)^{\frac{1}{2}}$$

This equation can easily be rearranged so that it can be solved for $P_d$, the average pressure drop across the nozzles. $q_h'$ is the average flow rate through one nozzle expressed in standard conditions and can easily be calculated in the computer by dividing the measured total flow rate by the number of nozzles, using the measured pressure and temperature to correct the flow rate to standard conditions. $T_1$ and $P_1'$ are the measured temperature and pressure. It may be desirable to subtract a constant value which represents the average pipeline pressure drop between the point of measurement and the nozzle inlets from the signal provided by pressure transmitter 9 to obtain a more accurate value of $P_1'$, if the line drop is significant. Alternatively, the line drop could be calculated by computer 11 using methods presented in the abovereferenced publication. It may be desirable to add a constant value to the signal provided by temperature transmitter 8 to account for heat acquired by the air from the pipeline and distributor walls if the distance between the measuring point and the interior of the distributor is significant. Alternatively, computer 11 could be provided with a simple heat transfer algorithm familiar to those skilled in the art relating temperature increase to flow rate and possibly other variables which are usually measured but not shown on the Drawing, such as regenerator temperature. $S_g$, the ratio of the molecular weight of the flowing gas to that of air, and $d_0^2$, the nozzle diameter, are constants for a particular installation and are stored in the computer. Y, the expansion factor for compressible flow, can be calculated in the computer for each value of the measured flow or an average value can be chosen for a particular installation without significant loss of accuracy. Page A-21 of the Crane Technical Paper can be consulted to establish Y. If it is desired to calculate Y in the computer, note that a trial and error procedure will have to be used, since Y is a function of $P_d$. A value of C, the nozzle flow coefficient, can be chosen for a particular installation by consulting page A-20 of the Crane Technical Paper.

The following simple numerical example, based on a typical fluid catalytic cracking unit, will be of help in appreciating the significance of the invention. Initial flow rate, $q_h'$, is 6500 SCFM (60° F.). This is derived from the measured air flow upon correction to standard temperature and pressure by use of the ideal gas law and use of the value of 1000 nozzles in the distributor of the example. $P_1'$ is 50 psia and nozzle diameter is 0.75 inch. $T_1$ is 1059° R., the temperature increase from ambient atmosphere resulting from heat of compression and heating of 200° F. by the pipeline walls. $S_g$ is 1 since the gas is air. For purposes of this illustration, C and Y are taken as each equal to 1, since their values are close to 1. Using the equation presented, initial $P_d$ is 1.7 psi. The static head in the regeneration vessel is the product of the bed height of 10 feet, density of the fluidized bed of 30 lbs/ft³, and the appropriate conversion factor. Multiplying by the generally accepted value of 0.33 results in a minimum acceptable average pressure drop of 0.69. When a change in feed rate to the catalytic cracking process results in an air flow rate of 60% of the initial rate, the new $P_d$ from the equation presented is 0.61 psi. This is below the minimum and it is likely that operating at this value will result in inactive nozzles. Referring to the Drawing, computer 11 will therefore not permit the air flow rate to remain at 60% of initial flow. Other process changes can be made so that the reduction to 60% can be accomplished, however. If operating pressures in the cracking unit are adjusted so that $P_1'$ is reduced to 35 psia at 60% of initial flow, $P_d$ will increase to 0.87 psi, an acceptable value assuming that static head remains constant. Temperature has been assumed to remain constant.

The example of the Drawing as explained above uses a scheme in which a gas flow adjustment by the unit operating personnel is subject to a minimum established in a computer. There are many other variations included within the scope of this invention. For example, the computer could be arranged so as to automatically adjust pressure or to provide an alarm so that operators can freely adjust process variables but are made aware that they are causing the occurrence of inactive nozzles.

In the numerical example, static head was taken as a constant. It may be desirable to calculate a value of static head in the computer for each value of air flow, since the value can change. The component variables which are multiplied together to obtain static head are often measured in processes in which this invention is useful.

It should be noted that this invention can often be practiced with a minimal additional equipment requirement. For example, in a typical fluid catalytic cracking process, the only variable mentioned which is not normally measured when the invention is not practiced is air temperature. Thus the basic equipment requirement consists of a temperature transmitter and a simple computer which usually would be purchased as part of the compressor controller mentioned above. Note that there is no requirement to take measurements inside the process vessel or at points where special and costly provisions need to be made to prevent particles from entering or otherwise interfering with the measuring instruments.

I claim as my invention:

1. A process vessel in combination with a control system for maintaining average pressure drop across gas discharge nozzles above a minimum value to prevent the possibility of inactive nozzles, said nozzles comprising part of a distributor to which is supplied gas by means of a pipeline, said distributor used to distribute the gas about the lower portion of said processing vessel which contains a liquid or particulate matter, wherein said control system comprises:

(a) means for establishing a flow signal representative of the rate of flow of gas in said pipeline supplying the gas to said distributor;

(b) means for establishing a temperature signal representative of the temperature of the gas flowing in said distributor;

(c) means for establishing a pressure signal representative of the pressure of the gas flowing in said distributor;

(d) computing means for calculating the average pressure drop across said nozzles using said flow, pressure, and temperature signals and appropriate constant parameters and equations;

(e) means for comparing said average pressure drop across said nozzles with a minimum value, generating a correction signal if said minimum value is larger, and transmitting said correction signal; and (f) adjustment means responsive to said correction signal which are capable of increasing the average pressure drop across said nozzles to prevent the occurrence of inactive nozzles.

2. The apparatus of claim 1 further characterized with respect to element (f) in that said adjustment means increase gas flow to the processing vessel.

3. The apparatus of claim 1 further characterized with respect to element (f) in that said adjustment means decrease gas pressure upstream of the nozzles.

4. The apparatus of claim 1 further characterized in that said correction signal actuates an alarm which notifies a process operator to take corrective action.

5. The apparatus of claim 1 further characterized in that the contents of said processing vessel comprise a fluidized bed of particulate matter.

6. The apparatus of claim 1 further characterized in that said processing vessel is a fluid catalytic cracking unit regenerator.

7. The apparatus of claim 1 further characterized in that said minimum value is a number representative of the static head of the liquid or particulate matter in said processing vessel multiplied times a positive number less than unity.

8. The apparatus of claim 7 further characterized in that said number representative of the static head is a constant value.

9. The apparatus of claim 7 further characterized in that said number representative of the static head is calculated from a constant value and a signal representative of the density of the contents of said processing vessel.

10. The apparatus of claim 7 further characterized in that said number representative of the static head is calculated from a constant value and a signal representative of the height of the contents of said processing vessel.

* * * * *